(12) United States Patent
Berends et al.

(10) Patent No.: US 10,676,683 B2
(45) Date of Patent: Jun. 9, 2020

(54) PROCESS TO PREPARE A CHAR PRODUCT AND A SYNGAS MIXTURE

(71) Applicant: TORRGAS TECHNOLOGY B.V., Amsterdam (NL)

(72) Inventors: Robert Hugo Berends, Deventer (NL); Robin Pieter Post Van Der Burg, Amsterdam (NL)

(73) Assignee: TORRGAS TECHNOLOGY B.V., Amsterdam (NL)

( * ) Notice: Subject to any disclaimer, the term of this patent is extended or adjusted under 35 U.S.C. 154(b) by 23 days.

(21) Appl. No.: 16/084,776

(22) PCT Filed: Mar. 15, 2017

(86) PCT No.: PCT/NL2017/050162
§ 371 (c)(1),
(2) Date: Sep. 13, 2018

(87) PCT Pub. No.: WO2017/160146
PCT Pub. Date: Sep. 21, 2017

(65) Prior Publication Data
US 2019/0078031 A1 Mar. 14, 2019

(30) Foreign Application Priority Data

Mar. 15, 2016 (NL) ...................... 2016437

(51) Int. Cl.
*C10J 3/48* (2006.01)
*C10K 3/00* (2006.01)
(Continued)

(52) U.S. Cl.
CPC .................. *C10J 3/487* (2013.01); *C01B 3/38* (2013.01); *C01B 3/48* (2013.01); *C10K 3/005* (2013.01);
(Continued)

(58) Field of Classification Search
CPC ...................................... C10J 3/00; C10J 3/46
See application file for complete search history.

(56) References Cited

U.S. PATENT DOCUMENTS

2002/0159929 A1* 10/2002 Kaneko ................ C07C 29/152
422/140
2011/0308155 A1* 12/2011 Paskach .................. C10J 3/463
48/77
2014/0298716 A1* 10/2014 Marty ....................... B01J 8/125
44/629

FOREIGN PATENT DOCUMENTS

NL 8701523 A 1/1989
WO 2013006035 A1 1/2013
(Continued)

OTHER PUBLICATIONS

Basu, "Biomass gasification and pyrolysis: practical design and theory." American Press (2010).
(Continued)

*Primary Examiner* — Matthew J Merkling
(74) *Attorney, Agent, or Firm* — Nixon Peabody LLP; Ronald I. Eisenstein; Nicole D. Kling

(57) ABSTRACT

The invention is directed to a process to prepare a char product and a syngas mixture comprising hydrogen and carbon monoxide from a solid biomass feed comprising the following steps: (i) performing a continuously operated partial oxidation of the solid biomass feed at a gas temperature of between 700 and 1100° C. and at a solids residence time of less than 5 seconds, (ii) continuously separating the formed char particles as the char product from the formed gaseous fraction and (iii) subjecting the gaseous fraction obtained in step (ii) to a continuously operated partial oxidation and/or to a steam reforming to obtain the syngas mixture. The solid biomass feed has been obtained by torrefaction of a starting material comprising lignocellulose
(Continued)

Figure 1:
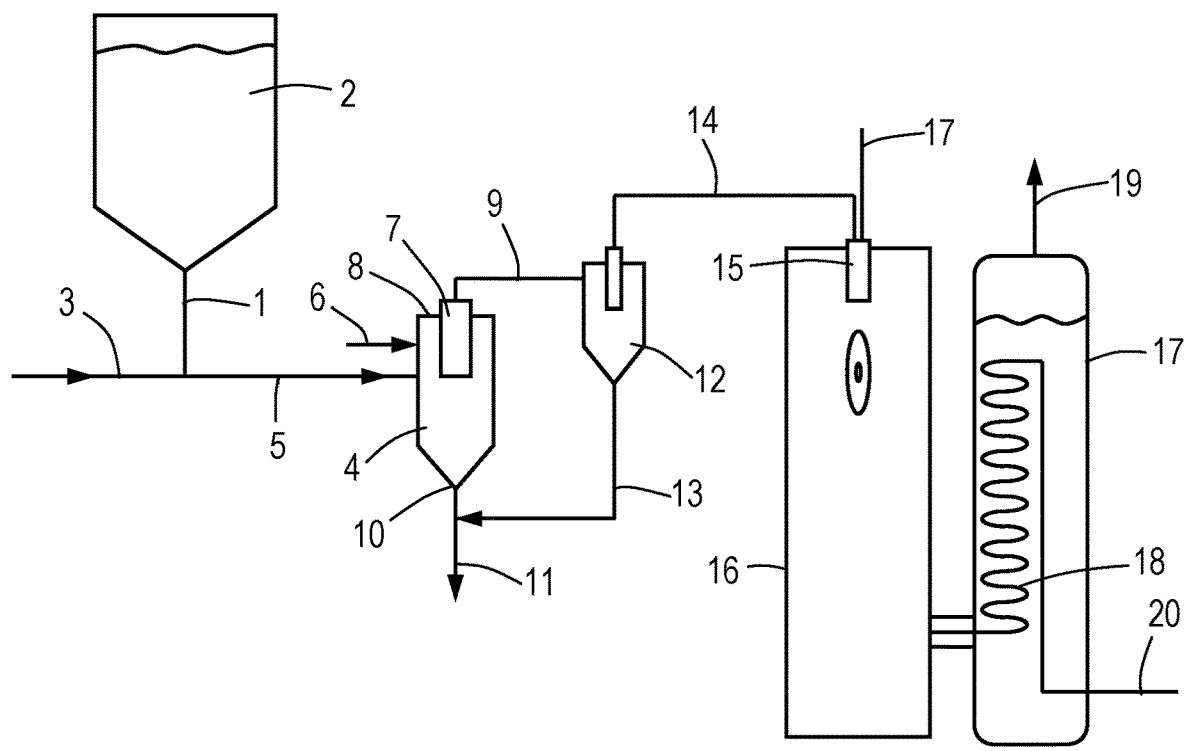

and is a sieve fraction wherein 99 wt % of the solid biomass particles is smaller than 2 mm.

19 Claims, 2 Drawing Sheets

(51) Int. Cl.
    *C01B 3/48*         (2006.01)
    *C01B 3/38*         (2006.01)

(52) U.S. Cl.
    CPC ........ *C10K 3/006* (2013.01); *C01B 2203/025* (2013.01); *C01B 2203/0233* (2013.01); *C01B 2203/0244* (2013.01); *C01B 2203/0283* (2013.01); *C01B 2203/06* (2013.01); *C01B 2203/061* (2013.01); *C01B 2203/062* (2013.01); *C01B 2203/066* (2013.01); *C01B 2203/068* (2013.01); *C10J 2200/15* (2013.01); *C10J 2200/39* (2013.01); *C10J 2300/0969* (2013.01); *C10J 2300/1612* (2013.01); *Y02P 20/145* (2015.11)

(56) References Cited

FOREIGN PATENT DOCUMENTS

WO     2015102480 A2     7/2015
WO     WO-2015102480 A2 *     7/2015

OTHER PUBLICATIONS

Sun, et al. "Experimental research on air staged cyclone gasification of rice husk." Fuel Processing Technology 90(4): 465-471 (2009).
Syred, et al. "Cyclone gasifier and cyclone combustor for the use of biomass derived gas in the operation of a small gas turbine in cogeneration plants." Fuel 83:17-18: 2381-2392 (2004).

* cited by examiner

PROCESS TO PREPARE A CHAR PRODUCT AND A SYNGAS MIXTURE

CROSS REFERENCE TO RELATED APPLICATIONS

This application is a 371 National Phase Entry of International Patent Application No. PCT/NL2017/050162 filed on Mar. 15, 2017 which claims benefit under 35 U.S.C. § 119(b) of NL Application No. 2016437 filed Mar. 15, 2016, the contents of which are incorporated herein by reference in their entirety.

The invention is directed to a process to prepare a syngas mixture comprising hydrogen and carbon monoxide from a solid biomass feed.

Such a process is described in EP1580253. In this process a biomass feed is first carbonized to obtain char and a pyrolysis gas. The char is subsequently gasified at a high temperature and the pyrolysis gas is fed to a gas reformer. The gasification temperature is such that the ash as present in the char is converted into slag.

A disadvantage of the process of EP1580253 and similar processes is that slag is formed. The slag consists of molten minerals which compounds are naturally present in biomass. This slag may cause fouling and requires high temperature handling when discharging the slag from the process. In large scale slagging coal gasification processes this may be feasible. In smaller scale biomass gasification processes the formation of such slag is found to complicate the process. Another disadvantage is that the alkali compounds, and especially potassium, may vaporise at the higher temperatures and may cause fouling in possible downstream cooling equipment.

US2010/0270506 describes a process starting from a biomass which avoids the formation of slag. In this process a biomass feed is first contacted with a pulsed flow of oxygen in a first fluidized bed containing alpha-alumina as the fluidizing solids at a temperature of between 760 and 871° C. The formed syngas consisting of hydrogen, carbon monoxide, carbon dioxide, water and methane and a small amount of other hydrocarbons is isolated from the formed char and the alumina particles. The mixture of char and alumina is transported to a second fluidizing reactor wherein the carbon as present in the char is combusted. The heat of combustion is used to heat up the biomass feed. This is achieved by contacting part of the heated alumina of the second reactor with the biomass feed in a riser before the biomass is fed to the first reactor. In order to avoid a build-up of ash in the second reactor a purge of alumina and ash will be required.

A disadvantage of the process of US2010/0270506 is the use of fluidized beds. These reactors are large and complex, for example because of the solids handling. Furthermore the process will consume alpha-alumina particles for example by attrition and via the above referred to purge. Finally the quality of the syngas is not optimal because it contains methane and higher boiling hydrocarbons. These higher boiling hydrocarbons may condense in downstream sections of the process. This is not advantageous and may result in fouling and resulting operational problems.

WO2013006035 describes a cyclone reactor for gasification of a biomass feed having a particles size of between 2 and 20 mm. An ash fraction is formed in the cyclone reactor and discharged to a waste chamber.

WO2015102480 describes a cyclone reactor in which biomass particles having a size up to 25 mm may be gasified to a mixture comprising of hydrogen and carbon monoxide. Solids, referred to as dust is separated in the cyclone reactor. The cyclone reactor may also be used for torrefaction of biomass.

The following process according to the present invention aims to avoid the above referred to problems.

Process to prepare a char product and a syngas mixture comprising hydrogen and carbon monoxide from a solid biomass feed comprising the following steps:

(i) performing a continuously operated partial oxidation of the solid biomass feed at a gas temperature of between 700 and 1100° C. and at a solids residence time of less than 5 seconds thereby obtaining a gaseous fraction comprising hydrogen, carbon monoxide and a mixture of gaseous organic compounds and a solid fraction comprising of char particles, (ii) continuously separating the char particles as the char product from the gaseous fraction and (iii) subjecting the gaseous fraction obtained in step (ii) to a continuously operated partial oxidation and/or to a steam reforming at high temperature to obtain the syngas mixture, wherein the solid biomass feed has been obtained by torrefaction of a starting material comprising lignocellulose and wherein the solid biomass feed is a sieve fraction wherein 99 wt % of the solid biomass particles is smaller than 2 mm.

The above process is advantageous because it can prepare a syngas in a simple process starting from a biomass feed. The process does not involve the use of fluidized beds and thus also avoids the use of a heat carrier like the alpha-alumina particles. Furthermore the syngas as prepared does not contain or at least not in any significant amount any higher hydrocarbons. This is achieved by performing a partial oxidation and/or a steam reforming step under the conditions to prepare syngas in step (iii). A next advantage is that the process equipment is small relative to the amount of syngas prepared. This is a direct result of the short residence times in step (i). Because no slag is formed due to the chosen temperature range in step (i) no special measures have to be taken for discharge of the slag and/or protection of the process equipment against the slag or molten slag. The latter enables one to use simpler process equipment.

Applicants found that by performing step (i) at the lower temperature conditions it is possible to convert a considerable amount of the carbon as present in the biomass feed to gaseous hydrocarbons and eventually to the desired hydrogen and carbon monoxide. The remaining char particle will comprise ash compounds and carbon. By isolating the char before performing step (iii) the formation of slag and its associated problems is avoided. This makes it possible to perform step (iii) at the higher partial oxidation temperature which favours the conversion of the hydrocarbons to hydrogen and carbon monoxide. Thus instead of trying to convert the char which is typically formed in the prior art processes the char is isolated as a valuable product of the process.

Applicants further found that by starting with the specified biomass feed a char product is obtained which may find application in various uses and therefore is not considered as a waste stream as in some of the prior art processes.

The process shall be described in more detail below.

The solid biomass feed as used in step (i) is suitably a sieve fraction wherein 99 wt % is smaller than 2 mm. Such a particles size is advantageous to enable sufficient mass transport and reaction of the carbon present in the biomass feed in the short residence time of step (i) and to obtain a char product of high quality. The biomass may be reduced to this preferred size using for example the following mechanical size reduction equipment like rotary breakers, roll crushers, jet mills, cryogenic mills, hammermills, impactors, tumbling mills, roller mills, shear grinders, and knife mills.

The solid biomass feed suitably has been obtained by torrefaction of a starting material comprising the lignocellulosic material as will be further described below. Lignocellulose is composed of carbohydrate polymers, cellulose and hemicellulose, and an aromatic polymer referred to as lignin. Such a process not only increases the heating value per mass biomass by torrefaction but may also remove a substantial amount of water, especially so-called boundwater, from the biomass starting material. The energy density of the biomass starting material is increased by decomposing all or part of the hemicelluloses as present in the biomass. Thus the invention is especially directed to a process wherein the solid biomass feed has been obtained by torrefaction of a starting material comprising hemicellulose. An advantage of using a torrefied biomass feed is that the properties of torrefied biomass feeds obtained from different biomass sources may be more uniform than the properties of the original biomass sources. This simplifies the operation of the process according to the invention. Another advantage is that torrefied material can easily be ground to at or near the desired particle size as described above. Such particle size reduction will be performed at a significant lower energy consumption as compared to the energy consumption of a particle size reduction of the original (non-torrefied) biomass source. However when the location of the torrefaction process is distant from the location of the present process it may be advantageous to pelletize the torrefied biomass for ease of transportation. Suitably such pellets are reduced in size to obtain the above described particle sizes before using the torrefied biomass as feed in the process according to the invention. It has been found that when torrefied biomass feed is used which has not been pelletized a char product is obtained having a higher active surface area when compared to when a torrefied feed is used which had been pelletized.

The biomass starting material which may be subjected to torrefaction comprises lignocellulose and therefore also hemicellulose. Examples of suitable biomass feeds which may be subjected to torrefaction are described here below. This may be any material comprising lignocellulose including virgin biomass and waste biomass. Virgin biomass includes all naturally occurring terrestrial plants such as trees, i.e. wood, bushes and grass. Waste biomass is produced as a low value by-product of various industrial sectors such as the agricultural and forestry sector. Examples of agriculture waste biomass are corn stover, sugarcane bagasse, beet pulp, rice straw, rice hulls, barley straw, corn cobs, wheat straw, canola straw, rice straw, oat straw, oat hulls and corn fibre. A specific example is palm oil waste such as oil palm fronds (OPF), roots and trunks and the by-products obtained at the palm oil mill, such as for example empty fruit bunches (EFB), fruit fibers, kernel shells, palm oil mill effluent and palm kernel cake. Examples of forestry waste biomass are saw mill and paper mill discards. For urban areas, the best potential plant biomass feedstock includes yard waste (e.g., grass clippings, leaves, tree clippings, and brush) and vegetable processing waste. Waste biomass may also be Refuse-derived fuel (RDF) or Specified Recovered Fuel (SRF) comprising lignocellulose. The biomass starting material which may be subjected to torrefaction may be a mixture originating from different lignocellulosic feedstocks. Furthermore, the biomass feed may comprise fresh lignocellulosic compounds, partially dried lignocellulosic compounds, fully dried lignocellulosic compounds or a combination thereof. In general, the term "biomass" as used herein includes all of the terms, plant biomass, lignocellulosic, cellulosic, and hemicellulosic.

Torrefaction is a well-known process and for example described in WO2012/102617. In such a process the biomass is heated to an elevated temperature in the absence of oxygen. Such a process is sometimes referred to as roasting. The temperature and residence time of the torrefaction process is preferably so chosen that the resulting material is easily reducible in size and has a high content of so-called volatiles, i.e. organic compounds.

The biomass feed suitably contains less than 10 wt %, preferably less than 7 wt %, and more preferably less than 4 wt % moisture, based on the total weight of the biomass. The content of water of the biomass may be reduced to these preferred levels by drying and/or by torrefaction.

In step (i) a partial oxidation of the solid biomass feed is performed at a gas temperature of between 700 and 1100° C. and at a solids residence time of less than 5 seconds. The residence time is the residence time of the solid particles in step (i). Preferably this residence time is less than 2 seconds to ensure that a sufficient amount of carbon remains in the char product and a minimum amount of minerals are released from the biomass feed particles and resulting char particles to the gaseous fraction. The amount of such mineral loss to the gaseous fraction is to be minimised because it is difficult to remove these typically smaller mineral particles from the gaseous fraction in subsequent step (ii). The gas temperature is preferably between 750 and 1000° C. The temperature of the solid biomass feed and the solid fraction comprising of char particles is suitably below 800° C. The difference in gas temperature and solids temperature is achieved by performing step (i) at a very low solids residence time. The difference in gas and solid temperature can be explained as follows. The higher gas temperature is obtained when the evaporated gasses from the solid biomass particles are partial oxidised. This high gas temperate will by means of heat transfer heat up the solid phase, which in turn result in evaporation of gasses from the solid phase. In this manner step (i) is self-sustaining. Furthermore it is preferred to perform step (ii) quickly after performing step (i). A suitable reactor in which this may be achieved will be described in more detail below.

The absolute pressure may vary between 90 kPa en 10 MPa and preferably between 90 kPa en 5 MPa. Pressures at the higher end of these ranges are advantageous when the syngas is to be used in downstream processes which require a syngas having such elevated or even higher pressures. The lower pressure range may be used when the syngas is used as fuel for a gas engine or steam boiler to generate electricity.

In step (i) a gaseous fraction comprising hydrogen, carbon monoxide and a mixture of gaseous organic compounds and a solid fraction comprising of char particles is obtained. The gaseous organic compounds may comprise of non-condensed organic compounds which are formed in step (i). These compounds range from methane to organic compounds having up to 50 carbons and even more. The organic compounds include hydrocarbons and oxygenated hydrocarbons. The fraction of these organic compounds in the gaseous fraction obtained in step (ii) may be greater than 15 wt %. The gaseous fraction obtained in step (i) may also contain sulphur compounds, such as hydrogen sulphide, sulphinated hydrocarbons and chlorine containing compounds like hydrogen chloride and nitrogen containing compounds like ammonia and hydrogen cyanide. The amount of the latter compounds will depend on the composition of the feed material.

The partial oxidation is performed by reaction of oxygen with the biomass feed, wherein a sub-stoichiometric amount of oxygen relative to the combustible matter as present in the biomass feed is used. The oxygen comprising stream as used may be oxygen, air or enriched air. The purity of the oxygen comprising stream is preferably at least 90 vol %, more preferably at least 94 vol %, wherein nitrogen, carbon dioxide and argon may be present as impurities. Substantially such pure oxygen is preferred, such as prepared by an air separation unit (ASU) or by a water splitter, also referred to as electrolysis. The amount of oxygen fed to step (i) is preferably between 0.1 and 0.3 mass oxygen per mass biomass as fed to step (i).

Step (i) is preferably performed by feeding a mixture comprising the solid biomass and a carrier gas to a reactor in which the partial oxidation takes place. Suitable carrier gasses are nitrogen, carbon dioxide, syngas and steam. But also air may be used as a carrier gas. When air is used as the carrier gas part of the required oxygen for performing the partial oxidation may be supplied to step (i) in this manner. Optionally additional oxygen may be supplied separately, wherein the additional oxygen may be enriched air or the more concentrated oxygen streams as described above. The mass ratio of carrier gas and biomass is preferably between 0.05 and 0.25. The biomass and carrier gas mixture as it is fed to the reactor may be preheated. This is suitably achieved by using a carrier gas having an elevated temperature and mixing this carrier gas with the biomass feed. The desired temperature of the carrier gas will depend on its heat capacity and may vary depending on the type of carrier gas. When nitrogen is used the temperature of the carrier gas is suitably between 250 and 300° C. and when steam is used the temperature of the carrier gas is suitably between 400 and 500° C.

When step (i) is performed at an elevated pressure the solids and carrier gas will have to be brought to that pressure level before being able to feed this mixture to a reactor in which step (i) is performed. This pressurisation of the solid biomass may be performed in a lock hopper as described in U.S. Pat. No. 4,955,989 and US2011100274. Pressurisation may also be performed using a solids pump as for example described in U.S. Pat. No. 4,988,239 or US2009178336.

The reactor in which step (i) is performed may be any short contact reactor in which the solids residence time can be kept below the claimed values. An example of such a reactor is a tube reactor having an inlet for biomass solids, carrier gas and oxygen at one end of a tubular space of the reactor and an outlet at its opposite end. Preferably step (i) is performed in a cyclone reactor which also is suited to perform step (ii). In this manner de separation follows quickly the partial oxidation. Preferably step (i) and step (ii) is performed in a cyclone reactor having a tangential inlet or inlets through which the biomass and carrier gas and/or an oxygen comprising gas is fed to the reactor, a gas outlet tube protruding the roof of the reactor through which the gaseous fraction comprising hydrogen, carbon monoxide and a mixture of gaseous hydrocarbons is discharged from the reactor and a solids outlet at the bottom of the reactor through which the char particles are discharged from the reactor. The cyclone reactor is advantageous because the char particles can be quickly separated from the gaseous fraction. A further advantage is that the residence time of the larger biomass particles will be slightly higher than the smaller biomass ensuring sufficient residence time of all particles to react. In this manner the carbon present in the larger particles may be converted by the partial oxidation and/or by evaporation which is beneficial for the carbon efficiency of the process.

The biomass feed is preferably fed to the cyclone reactor in admixture of a carrier gas. The gas velocity of the carrier gas as it is discharged into the reactor is preferably between 8 and 30 m/s and more preferably between 15 and 25 m/s. The oxygen comprising stream may be fed separately to the reactor or in admixture with the biomass and carrier gas. Alternatively the oxygen comprising gas, suitably air, is the carrier gas as described above. By ensuring a high gas velocity and sufficient low temperature, suitably below 300° C., of the carrier gas any early combustion within the supply conduits when supplying oxygen in admixture with biomass can be avoided. The number of tangential inlets for the biomass-carrier gas may be one, two, three or more. A cyclone reactor having one or two tangential inlets through which a mixture of oxygen-biomass feed and carrier gas is supplied to the reactor has found to function good. The temperature of the inner wall of the cyclone reactor is preferably maintained at a temperature below 800° C.

The gaseous fraction obtained in the above described cyclone reactor may suitably be subjected to a further gas-solids separation step to obtain a cleaned gaseous fraction and char particles and wherein the cleaned gaseous fraction is subjected to step (iii).

If step (ii) is performed as a separate step it may be performed using any known solids-gas separation technique at high temperature, suitably between 600 and 1000° C., to avoid condensation of the heavy hydrocarbons and to sustain high energy efficiencies of the combined steps (i), (il) and (iii). Preferably a technique is used wherein use is made of centrifugal forces, like in a cyclone. A series of two or even more cyclones may be applied to achieve a good separation of the solid char particles and the gaseous fraction. To separate even more of the solids at the elevated temperatures of the gaseous fraction between step (i) and step (iii) filters, like candle filters may be used.

The gaseous fraction as obtained in step (ii) or combined step (i) and (ii) as described above is subjected in a step (iii) to a partial oxidation and/or to a steam reforming to obtain the syngas mixture. In this step (iii) the C1 and higher hydrocarbons and oxygenates as present in the gaseous fraction are mainly converted to hydrogen and carbon monoxide. This may be performed by steam reforming over a suitable catalyst. Preferably sulphur tolerant catalysts are used. Optionally sulphur and other catalyst poisons for the steam reforming catalyst may be removed from the gaseous fraction before performing a steam reforming process. A combination of a partial oxidation and steam reforming, also referred to as auto-thermal reforming, is also possible. But again a sulphur tolerant catalyst and/or a gas cleaning might be necessary in order to run such a process.

Preferably step (iii) is performed by means of a partial oxidation. Such a process does not involve the use of catalyst and is able to convert a sulphur containing feedstock. Preferably the gaseous fraction obtained in step (ii) is subjected to a partial oxidation step (iii) at a temperature of between 1100 and 1600 C. more preferably between 1200 and 1500° C., and at a residence time of less than 5 seconds, more preferably at a residence time of less than 3 seconds. The residence time is the average gas residence time in the partial oxidation reactor. The partial oxidation is performed by reaction of oxygen with the organic compounds as present in the gaseous fraction, wherein a sub-stoichiometric amount of oxygen relative to the combustible matter as present in the gaseous fraction is used. The oxygen comprising gas is suitably of the same composition as the oxygen comprising gas as used in step (i). The total amount of oxygen fed to step (i) and to step (iii) is preferably between 0.1 and 0.6 mass oxygen per mass biomass as fed to step (i) and more preferably between 0.2 and 0.4 mass oxygen per mass biomass as fed to step (i).

A suitable partial oxidation process for step (iii) is for example the Shell Gasification Process as described in the Oil and Gas Journal, Sep. 6, 1971, pp. 85-90. In such a process the gaseous fraction and an oxygen comprising gas is provided to a burner placed at the top of a vertically oriented reactor vessel. Publications describing examples of partial oxidation processes are EP291111, WO9722547, WO9639354 and WO9603345. The hot product gasses are subsequently reduced in temperature in an adjacent boiler as for example described in WO07131975 and US2007267171. In such a boiler steam and overheated steam may be produced. The hot product gas of step (iii) may also be reduced in temperature by a direct quench with water.

The syngas mixture as prepared by the above process may be directly used as fuel for example to generate electricity. The syngas mixture may be subjected to a water gas shift reaction to convert part of all of the carbon monoxide to carbon dioxide and water to hydrogen. Such a water gas shift reaction could be beneficial to increase the hydrogen to carbon monoxide ratio as required in downstream processes or to produce hydrogen. The hydrogen can for example be used as fuel for fuel cells, fuels for hydrogen powered combustion engines and gas turbines or it can be mixed into the natural gas grid. Preferably the obtained syngas mixture is used as feedstock in various processes to make chemicals and fuels, such as the Fischer-Tropsch process, methanation process, methanol process, acetic acid process, ammonia process, DME process, etc)

For such processes the sulphur contaminants originating from the biomass feed will have to be removed from the syngas mixture. Processes which allow sulphur in the syngas is syngas fermentation, also known as synthesis gas fermentation. Syngas fermentation is a microbial process wherein the syngas is used as carbon and energy sources and then converted into fuel and chemicals by microorganisms. The products of syngas fermentation include ethanol, butanol, acetic acid, butyric acid and methane. There are several microorganisms, which can produce fuels and chemicals using syngas as feedstock. These microorganisms are mostly known as acetogens including *Clostridium ljungdahlii, Clostridium autoethanogenum, Eurobacterium limosum, Clostridium carboxidivorans* P7, *Peptostreptococcus* and *Butyribacterium methylotrophicum*. These processes mostly use the Wood-Ljungdahl pathway. Syngas fermentation process has advantages over a chemical process because it can take place at lower temperature and pressure, has higher reaction specificity, tolerates higher amounts of sulphur compounds, and does not require a specific ratio of $H_2$ to CO. The latter makes such a process very suitably to be combined with the process according to the invention because no gas treating and/or water gas shift is required. Further any variation in the hydrogen to carbon monoxide ratio in the syngas due to variation of the biomass feed quality will not be very critical.

The char particles as produced by the process according to the invention typically comprise of between 60 and 90 wt % of carbon as expressed carbon and between 5 and 20 wt % of ash, wherein the ash is determined by CEN/TS 14775 at 550° C. when applying low ash containing feedstock, like (torrefied) wood, straw or SRF. When high ash containing (torrefied) feedstock is applied much higher ash contents and lower carbon contents may be applicable. The particle size of the char particles as obtained in the process will be in the range of the particle size of the solid biomass feed. These char particles may suitably be pelletized to larger particles. The char particles may suitably be used as briquettes, metallurgical coke, activated coke, blast furnaces coke depending on the final quality of the char produced.

The invention will be illustrated making use of the following figures.

In FIG. 1 shows a process line up suited for the process according to the invention. Via stream 1 a solid biomass feed discharged from a biomass feed tank 2 is mixed with a carrier gas as provided via stream 3. The solid biomass feed and carrier gas is fed to a cyclone reactor 4 via stream 5. The solid biomass and carrier gas is provided together with an oxygen comprising stream 6 to the cyclone reactor 4. The inlet of the streams 5 and 6 are tangentially oriented in the cyclone reactor 4. In this Figure only one inlet is shown. The inlet for biomass feed and the oxygen comprising stream may be separate inlets or a combined inlet. The contact between the biomass and oxygen should be sufficient to maintain a partial combustion in this upper region of the cyclone reactor. When the reactor is started it is preferred to have an internal temperature of more than 400° C. within the reactor. This may be achieved by using a heated gas or by using a start-up burner.

The cyclone reactor 4 is provided with a gas outlet tube 7 protruding the roof 8 of the reactor 4. Through the gas outlet tube 7 the gaseous fraction comprising hydrogen, carbon monoxide and a mixture of gaseous hydrocarbons is discharged from the reactor via stream 9. The cyclone reactor 4 is provided with a solids outlet 10 at the bottom of the reactor 4 through which the char particles are discharged from the reactor via stream 11. When the reactor 4 is operated at elevated pressures a sluice system may be present at this point to discharge the char particles from the high pressure reactor level to ambient pressure conditions.

The gaseous fraction in stream 9 may still comprise some solid particles. These particles may be separated from the gaseous fraction in a second cyclone separator 12. The solids as separated in stream 13 may be combined with the solids obtained in reactor 4 of stream 11 as shown. The obtained cleaned gaseous fraction in stream 14 is provided to a burner 15 of a partial oxidation reactor 16. To said burner also an oxygen comprising gas is fed via stream 17 and optionally a moderator gas, like steam (not shown). The hot syngas mixture as obtained in reactor 16 is provided to the tube 18 side of a sensible heat boiler 17. In the sensible heat boiler 17 water evaporates to obtain steam which is discharged from the boiler via stream 19. The steam as obtained or a super-heated steam which may be obtained when a special boiler is used may be used as carrier gas. The syngas mixture is cooled and discharged via stream 20.

The optimal dimensions and capacity of a cyclone reactor 4 may be smaller than the optimal capacity of a partial oxidation reactor 16 and/or boiler 17. Thus it may be advantageous to operate a number of cyclone reactors 4 in parallel all generating a cleaned gaseous fraction in a stream 14. These gaseous fractions may be combined and provided to one partial oxidation reactor 16.

Figure 2:
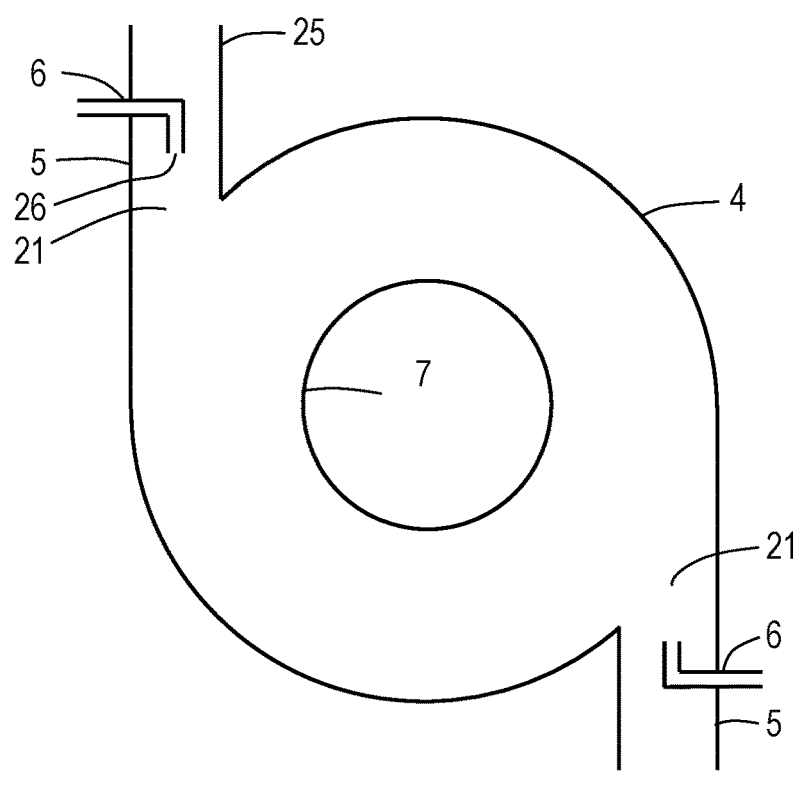

FIG. 2 shows a detail of the cyclone reactor 4. A cross-sectional horizontal view from above is shown at the level of the tangential inlets 21 for biomass feed and oxygen comprising gas. In this figure it is shown that the biomass feed and carrier gas as present in stream 5 in tangentially directed conduit 25 are combined with the oxygen comprising gas as present in stream 6 via oxygen outlet opening 26 and that the combined stream enters tangential the cyclone reactor. FIG. 2 also shows the gas outlet tube 7.

Figure 3:
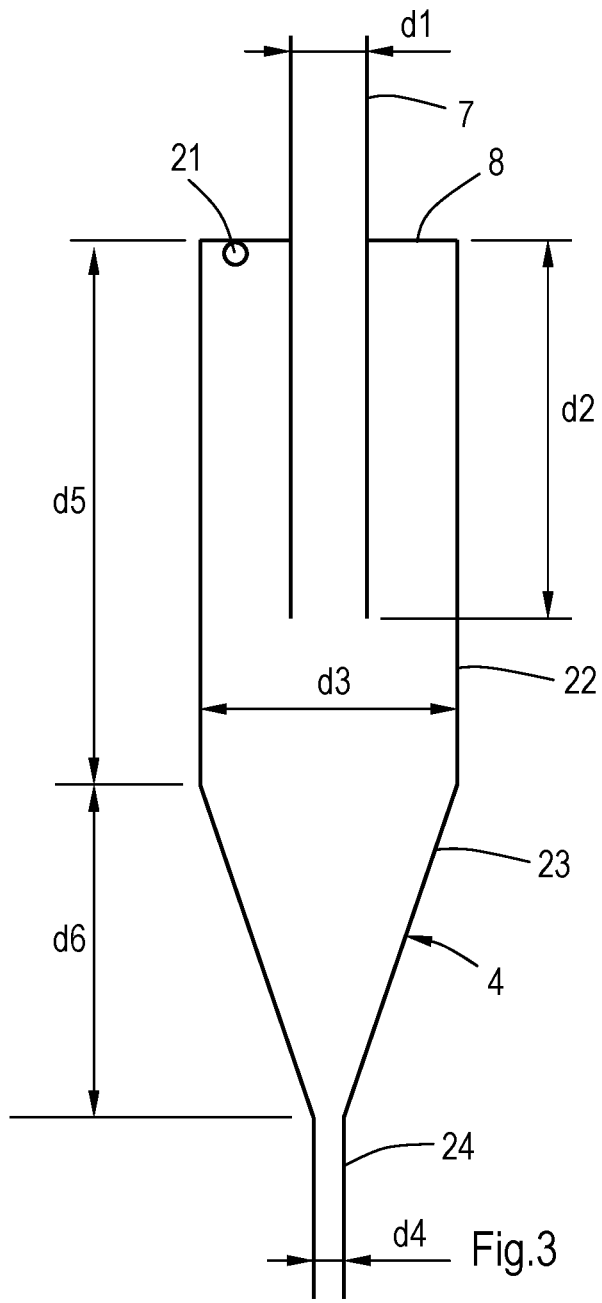

In FIG. 3 the top part of the cyclone is provided having relative dimensions of a cyclone reactor which could be used in the present process. The tangential inlets 21 are flush or nearly with the roof 8 of the cyclone reactor 4. This is to ensure proper mixing/swirl and centrifugal forces in the upper part of the cyclone reactor. The cyclone reactor 4 consists of an upper tubular part 22 and a lower frusta conical part 23. At the lower end of conical part 23 a solids discharge conduit 24 is present. The diameter of tubular part 22 is the cyclone diameter d3. This diameter d3 is suitably at least 100 mm, Suitably the cyclone diameter is less than 1,500 mm because at greater dimensions proper mixing and heat transfer will become a problem. This limitation sets a maximum on the capacity of a single cyclone reactor. Any capacity increase beyond such a maximum can be reached by using a multitude of these reactors in parallel. Suitably the length d2 at which the gas outlet tube 7 protrudes the cyclone from above is at least 1 times cyclone diameter d3 and preferably between 1.5 and 2 times cyclone diameter d3. It has been found that such a dimension provides an optimal reaction path for the solid biomass particles to react before the separation region in the cyclone reactor is reached. The internal diameter d1 of the gas outlet tube 7 is suitably between 0.4 and 0.0.6 times the cyclone diameter d3.

The length d5 of tubular part 22 of cyclone reactor 4 is slightly greater than length d2 and suitably at least 1.5 times cyclone diameter d3. The maximum length is less relevant but for practical reasons it will be suitably below 2.5 times cyclone diameter d3. The length d6 of the conical part 23 should be at least sufficient to efficiently transport the char particles to the solids discharge tube 24 and is preferably at least 1.5 times the cyclone diameter d3 and a most 3, preferably 2.5 times the cyclone diameter d3. The internal diameter d4 of the solids discharge tube 24 should be sufficient to allow a flow of char particles and is suitably at least 50 mm and at least 0.3 times the cyclone diameter d3. The maximum diameter will be determined by the length d6 of the conical part 23.

The cyclone reactor may be made from a refractory lined carbon steel or corrosion resistant steel.

The invention claimed is:

1. A process to prepare a char product and a syngas mixture comprising hydrogen and carbon monoxide from a solid biomass feed comprising the following steps:
   (i) performing a continuously operated partial oxidation of the solid biomass feed at a gas temperature of between 700 and 1100° C. and at a solids residence time of less than 5 seconds thereby obtaining a gaseous fraction comprising hydrogen, carbon monoxide and a mixture of gaseous organic compounds and a solid fraction comprising of char particles comprising ash and carbon,
   (ii) continuously separating the char particles as the char product from the gaseous fraction, and
   (iii) subjecting the gaseous fraction obtained in step (ii) to a continuously operated partial oxidation at a temperature of between 1100 and 1600° C. and at a residence time of less than 5 seconds to obtain the syngas mixture, wherein the solid biomass feed has been obtained by torrefaction of a starting material comprising lignocellulose and wherein the solid biomass feed is a sieve fraction wherein 99 wt % of the solid biomass particles is smaller than 2 mm and,
   wherein the char particles are pelletized to larger particles.

2. The process according to claim 1, wherein the gas temperature in step (i) is between 750 and 1000° C.

3. The process according to claim 1, wherein the temperature of the solid biomass feed and the solid fraction comprising of char particles is below 800° C.

4. The process according to claim 1, wherein the residence time in step (i) is less than 2 seconds.

5. The process according to claim 1, wherein the absolute pressure in step (i) or in step (ii), or both, is between 90 kPa en 10 MPa.

6. The process according to claim 1, wherein in step (i) a mixture comprising the solid biomass and a carrier gas is fed to a reactor in which the partial oxidation of step (i) takes place.

7. The process according to claim 6, wherein the mass ratio of carrier gas and biomass is between 0.05 and 0.25.

8. The process according to claim 1, wherein the biomass feed contains less than 4 wt % moisture (water), based on the total weight of the biomass.

9. The process according to claim 6, wherein step (i) and step (ii) is performed in a cyclone reactor having a tangential inlet or inlets through which the biomass and carrier gas or an oxygen comprising gas, or both, is fed to the reactor, a gas outlet tube protruding the roof of the reactor through which the gaseous fraction comprising hydrogen, carbon monoxide and a mixture of gaseous hydrocarbons is discharged from the reactor and a solids outlet at the bottom of the reactor through which the char particles are discharged from the reactor.

10. The process according to claim 9, wherein the gas velocity of the carrier gas as it is fed into the reactor is between 8 and 30 m/s.

11. The process according to claim 10, wherein the gas velocity of the carrier gas as it is fed into the reactor is between 15 and 25 m/s.

12. The process according to claim 9, wherein the gaseous fraction is subjected to a further gas-solids separation step to obtain a cleaned gaseous fraction and char particles and wherein the cleaned gaseous fraction is subjected to step (iii).

13. The process according to claim 1, wherein the total amount of oxygen fed to step (i) and to step (iii) is between 0.1 and 0.6 mass oxygen per mass biomass as fed to step (i).

14. The process according to claim 13, wherein the total amount of oxygen fed to step (i) and to step (iii) is between 0.2 and 0.4 mass oxygen per mass biomass as fed to step (i).

15. The process according to claim 1, wherein the partial oxidation in step (i) is performed by reaction of oxygen with the solid biomass feed and wherein the purity of the oxygen is preferably at least 90 vol %.

16. The process according to claim 7, wherein step (i) and step (ii) is performed in a cyclone reactor having a tangential inlet or inlets through which the biomass and carrier gas or an oxygen comprising gas, or both, is fed to the reactor, a gas outlet tube protruding the roof of the reactor through which the gaseous fraction comprising hydrogen, carbon monoxide and a mixture of gaseous hydrocarbons is discharged from the reactor and a solids outlet at the bottom of the reactor through which the char particles are discharged from the reactor.

17. The process according to claim 8, wherein step (i) and step (ii) is performed in a cyclone reactor having a tangential inlet or inlets through which the biomass and carrier gas or an oxygen comprising gas, or both, is fed to the reactor, a gas outlet tube protruding the roof of the reactor through which the gaseous fraction comprising hydrogen, carbon monoxide and a mixture of gaseous hydrocarbons is discharged from the reactor and a solids outlet at the bottom of the reactor through which the char particles are discharged from the reactor.

18. The process according to claim 10, wherein the gaseous fraction is subjected to a further gas-solids separation step to obtain a cleaned gaseous fraction and char particles and wherein the cleaned gaseous fraction is subjected to step (iii).

19. The process according to claim 11, wherein the gaseous fraction is subjected to a further gas-solids separation step to obtain a cleaned gaseous fraction and char particles and wherein the cleaned gaseous fraction is subjected to step (iii).

* * * * *

UNITED STATES PATENT AND TRADEMARK OFFICE
CERTIFICATE OF CORRECTION

PATENT NO. : 10,676,683 B2
APPLICATION NO. : 16/084776
DATED : June 9, 2020
INVENTOR(S) : Robert Hugo Berends and Robin Pieter Post van der Burg Page 1 of 1

It is certified that error appears in the above-identified patent and that said Letters Patent is hereby corrected as shown below:

In the Claims

At Column 10, Claim 5, Line 8, "en" should be replaced with "and."

Signed and Sealed this
Eleventh Day of August, 2020

Andrei Iancu
*Director of the United States Patent and Trademark Office*